US009881586B2

(12) United States Patent
Luka et al.

(10) Patent No.: US 9,881,586 B2
(45) Date of Patent: Jan. 30, 2018

(54) UTILIZING HEURISTICS TO ENABLE SELF-ADJUSTING DISPLAYS

(71) Applicant: Disney Enterprises, Inc., Burbank, CA (US)

(72) Inventors: Stefan Luka, Sunland, CA (US);
Norbert Faerstain, Burbank, CA (US);
Leon Silverman, Encino, CA (US);
Howard Lukk, North Hollywood, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 55 days.

(21) Appl. No.: 14/285,239

(22) Filed: May 22, 2014

(65) Prior Publication Data
US 2015/0339964 A1    Nov. 26, 2015

(51) Int. Cl.
G09G 3/14       (2006.01)
G09G 5/02       (2006.01)
G06F 3/14       (2006.01)

(52) U.S. Cl.
CPC .............. *G09G 5/02* (2013.01); *G06F 3/14* (2013.01); *G09G 2320/0233* (2013.01); *G09G 2320/0242* (2013.01); *G09G 2320/0666* (2013.01); *G09G 2320/0693* (2013.01); *G09G 2370/022* (2013.01)

(58) Field of Classification Search
CPC .. G06F 3/14; H04N 1/32512; H04N 1/32529; H04N 1/6005; H04N 1/64; H04N 1/333; G09G 5/02
See application file for complete search history.

(56) References Cited

U.S. PATENT DOCUMENTS

| 6,809,726 | B2 | 10/2004 | Kavanagh |
| 6,963,668 | B2 | 11/2005 | Engeldrum et al. |
| 7,406,388 | B2 | 7/2008 | Casto et al. |
| 7,760,231 | B2 | 7/2010 | Sayre |
| 8,179,402 | B2 | 5/2012 | Ten |

(Continued)

OTHER PUBLICATIONS

Kim, Kil Joong et al., Measurements of achromatic and chromatic contrast sensitivity functions for an extended range of adaptation luminance, Proc. SPIE 8651, Human Vision and Electronic Imaging XVIII, 86511A, Mar. 14, 2013, pp. 1-14, vol. 8651, Burlingame, California, USA.

(Continued)

*Primary Examiner* — Shaheda Abdin
(74) *Attorney, Agent, or Firm* — Sheppard, Mullin, Richter & Hampton LLP

(57) ABSTRACT

Systems and methods for self-adjusting displays are provided. A self-adjusting display may receive a display characteristics shift profile, where the display characteristics shift profile can be generated based on calibration event data collected from a plurality of displays. The display characteristics shift profile can be utilized as an estimate or prediction of a shift in display characteristics the self-adjusting display may experience over time. The self-adjusting display may calculate adjustment factors or curves to compensate for the estimated/predicted shift in display characteristics to lessen or altogether eliminate the need for performing actual calibration on the self-adjusting display.

20 Claims, 6 Drawing Sheets

(56) References Cited

U.S. PATENT DOCUMENTS

| | | |
|---|---|---|
| 8,228,348 B2 | 7/2012 | Kimpe |
| 8,259,044 B2 | 9/2012 | Nathan et al. |
| 8,537,357 B2 | 9/2013 | Holub et al. |
| 8,582,034 B2 | 11/2013 | Kwong |
| 2002/0003903 A1* | 1/2002 | Engeldrum .............. G06F 3/14 382/233 |
| 2007/0067124 A1 | 3/2007 | Kimpe et al. |
| 2009/0141121 A1 | 6/2009 | Kimpe |
| 2010/0066837 A1* | 3/2010 | Kwong ................. H04N 17/04 348/180 |
| 2010/0214418 A1* | 8/2010 | Germain ............... G09G 3/006 348/189 |
| 2010/0265266 A1 | 10/2010 | Liu et al. |
| 2011/0175925 A1 | 7/2011 | Kane et al. |
| 2013/0135272 A1 | 5/2013 | Park |
| 2013/0187958 A1 | 7/2013 | Kimpe et al. |

OTHER PUBLICATIONS

Pinson, Margaret H. and Wolf, Stephen, A New Standardized Method for Objectively Measuring Video Quality, IEEE Transactions on Broadcasting, Sep. 2004, pp. 312-322, vol. 50, Issue: 3.

\* cited by examiner

UTILIZING HEURISTICS TO ENABLE SELF-ADJUSTING DISPLAYS

TECHNICAL FIELD

The present disclosure relates generally to electronic visual displays.

DESCRIPTION OF THE RELATED ART

Displays or monitors can refer to electronic visual displays used for the presentation of images, video, and/or other visual media. Modern displays may utilize technologies such as liquid crystal display (LCD), plasma display panel (PDP), light emitting diode (LED), organic LED (OLED) technologies, and may also include projector technologies, such as digital light processing (DLP), LCD, liquid crystal on silicon (LCOS), laser, and others. A modern display may use less power, and oftentimes has improved/higher luminance, contrast ratio, sharpness, spatial uniformity, and larger color gamut than cathode ray tube (CRT) displays.

BRIEF SUMMARY OF THE DISCLOSURE

Various embodiments are directed to estimating or predicting shift in one or more display characteristics of a display based on calibration event data gathered from a plurality of, e.g., other displays, where the display may adjust itself to compensate for the estimated or predicted shift in display characteristics.

In accordance with one embodiment, a computer-implemented method comprises receiving calibration event data from at least one of a first display and a second display. The computer-implemented method further comprises deriving statistical data regarding shifting of at least one display characteristic from the received calibration event data. Additionally still, the computer-implemented method comprises creating at least one display characteristics shift profile for the display characteristic upon which self-adjustment of the first display is based.

In accordance with another embodiment, a non-transitory computer readable medium has computer executable program code embodied thereon. The computer executable program code is configured to cause a non-calibrated display to receive at least one display characteristics shift profile, the display characteristics shift profile being derived from calibration event data associated with a plurality of displays. The computer executable program code also causes the non-calibrated display to calculate at least one adjustment factor to compensate for a predicted shift in display characteristics identified in the display characteristics shift profile, as well as perform self-adjustment utilizing the adjustment factor.

In accordance with yet another embodiment, a system comprises a first set of displays and a data repository connected to each of the first set of displays, where the data repository is configured to receive calibration event data collected from each of the first set of displays. The system further comprises a second set of displays communicatively connected to the data repository. Each of the second set of displays is configured to perform the following: receive a display characteristics shift profile associated with a display characteristic of each of the second set of displays, the display characteristics shift profile being derived from the calibration event data collected from each of the first set of displays; calculate at least one adjustment factor to compensate for a predicted shift in the display characteristic of each of the second set of displays, the predicted shift in the display characteristic being identified in the display characteristics shift profile; and perform self-adjustment utilizing the adjustment factor while in a non-calibrated state.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Displays can experience shifts or movement of their performance or operating characteristics, such as luminance, color rendition, etc., over time. This can be the result of display components aging, temperature changes in the environment in which a display is used, etc. Moreover, ambient lighting in an environment where a display is utilized can also change, thereby affecting a user's perception of color as rendered by a display. Accordingly, displays (especially those used in color-critical applications, such as multimedia creation, photo and video editing, etc.) may be calibrated to account for such shifts and/or environmental changes.

As utilized herein, the term "display" can refer to any electronic visual display, such as a computer monitor, a television monitor, a projector, or other type of display, whether configured for use in a consumer, professional, or other context. The term "calibration" can refer to measuring one or more performance characteristics, e.g., color response, on a display, and adjusting one or more elements or operating parameters of the display to some known state/settings based on those measurements.

Luminance can refer to a photometric measure of luminous intensity per unit area of light, and is often used to characterize emission or reflection from a flat, diffuse surface. Some displays, for example, can be set or configured to have a luminance of 120 $cd/m^2$ under normal (ambient) lighting conditions.

Figure 1A:
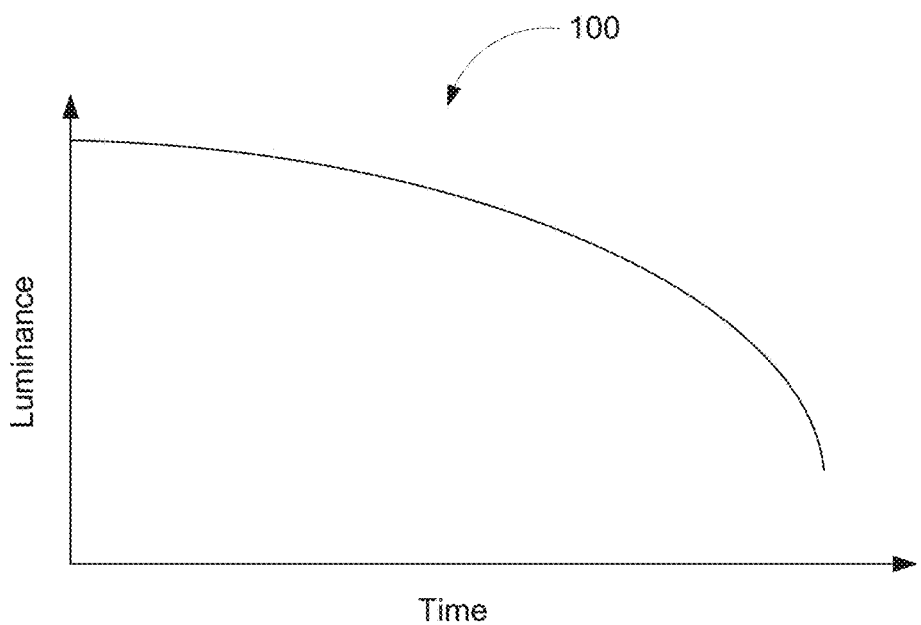
FIGS. 1A and 1B illustrate examples of shift in display characteristics over time in a display.

FIG. 1A is an example graph 100 plotting the luminance of a display as a function of time. Over the span of, e.g., hundreds or thousands of operating hours, the luminance of a display may shift. FIG. 1A illustrates this shift as a drop-off in intensity over time. In LCD displays, for example, this drop-off in luminance can be the result of an aging backlighting element in the LCD display. Therefore, calibration of the LCD display may be necessary to, e.g., increase the intensity at which the backlighting element operates, in order to compensate for this aging.

Colorimetry can refer to measuring color reproduction of a display quantified in accordance with standards of human color perception. As alluded to previously, the rendering of colors on a display may also shift over time. This can affect, e.g., the white point rendered by the display. White point can refer to the chromaticity coordinates that define the color "white" reproduced on a display. That is, over time, the display may render the color white with a chromaticity other than the intended target white.

Figure 1B:
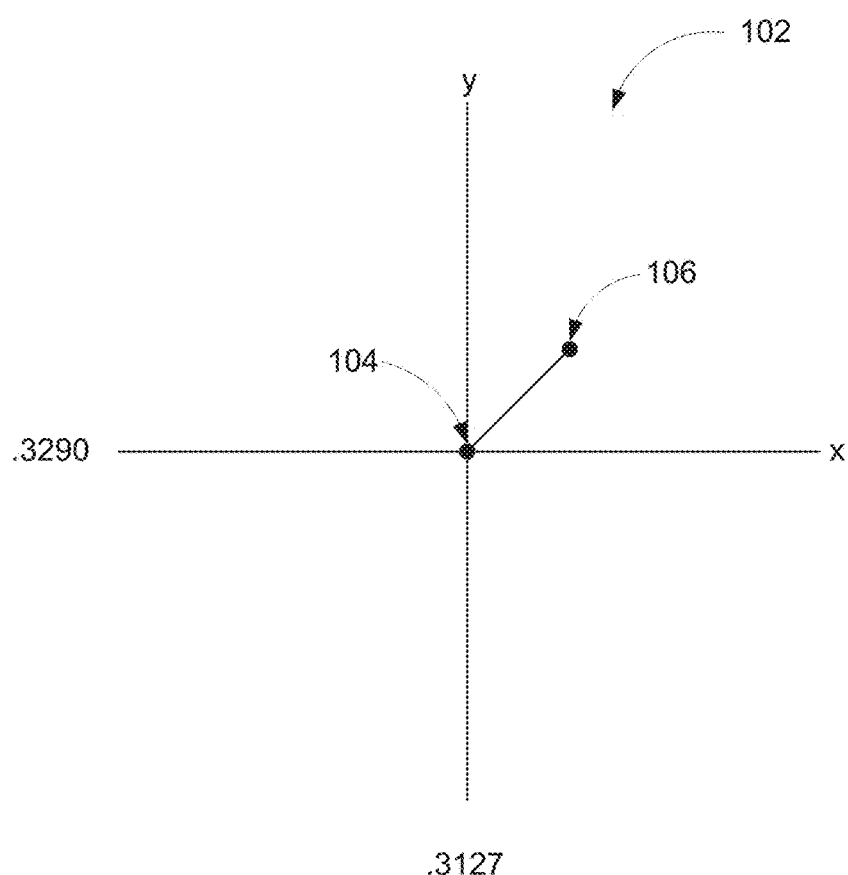

For example, the International Telecommunication Union Radiocommunication Sector (ITU-R) Recommendation BT.709, also known as Rec. 709, standardizes the format of high-definition television. According to Rec. 709, the RGB color space parameters set the white point x,y chromaticity value at 0.3127, 0.3290. Hence, displays configured to operate in accordance with Rec. 709 may be initially configured to render the color white at this setting. FIG. 1B is an example graph 102 illustrating a target white point 104 having the Rec. 709—defined x,y chromaticity value of 0.3127, 0.3290. Over time, the rendered white point 106 of a display can shift away from that target white point 104 to some other x,y chromaticity value that no longer conforms to the Rec. 709 standard. Again, calibration may be performed to return the white point to its original setting(s)/value(s).

Currently, calibration is performed manually. For example, a user may rely on software resident on a display or third party software, as well as specialized tools, such as a colorimeter, to measure the performance characteristics of the display. Once the measurements are obtained, the user can adjust the display based on those measurements. It should be noted that displays are often calibrated many times throughout their lifetime to maintain their optimal performance. Thus, in a media production setting, for example, calibrating displays can entail costs associated with purchasing calibration tools, software, etc., as well as costs and time associated with the manpower needed to manually perform calibration. It can also result in downtime while waiting for the displays to actually be calibrated.

In accordance with various embodiments, systems and methods are provided that can allow a display to self-adjust one or more its own performance or operating characteristics/parameters to reduce, or in some cases, eliminate the need for calibration. That is, a display can be given enough intelligence to maintain its own optimal performance characteristics, such as color and luminance. This can be achieved by leveraging embedded software logic with continually expanding statistics derived from calibration event data. The calibration event data may be gathered from, e.g., other displays, to estimate or predict a shift(s) in display characteristics of color and luminance drift, for example, over time. Actual calibration event data gleaned from the display can be combined with the display's own (or other displays') historical display usage statistics or metrics to compute adjustment factors or "curves." These adjustment factors or curves can be utilized to compensate for the estimated or predicted shift in display characteristics as the display ages and undergoes use. As will be described in greater detail below, depending upon what the adjustment factors or curves may be based, shift in display characteristics, in accordance with various embodiments, may be thought of as being estimated and/or predicted.

The display can continually learn from collected calibration event data, and can calculate or formulate the adjustment factors/curves in order to improve display characteristics shift estimation/prediction and compensation. It is contemplated that the display will eventually remain accurate enough through self-adjustment that actual calibration may yield less and less benefit over time. This may be especially true when compared to the effort and time involved in calibrating the display at regular intervals. Therefore, continuously improving self-adjustment can be achieved without the display undergoing actual calibration events, or at the least, performing much fewer calibrations.

Figure 2:
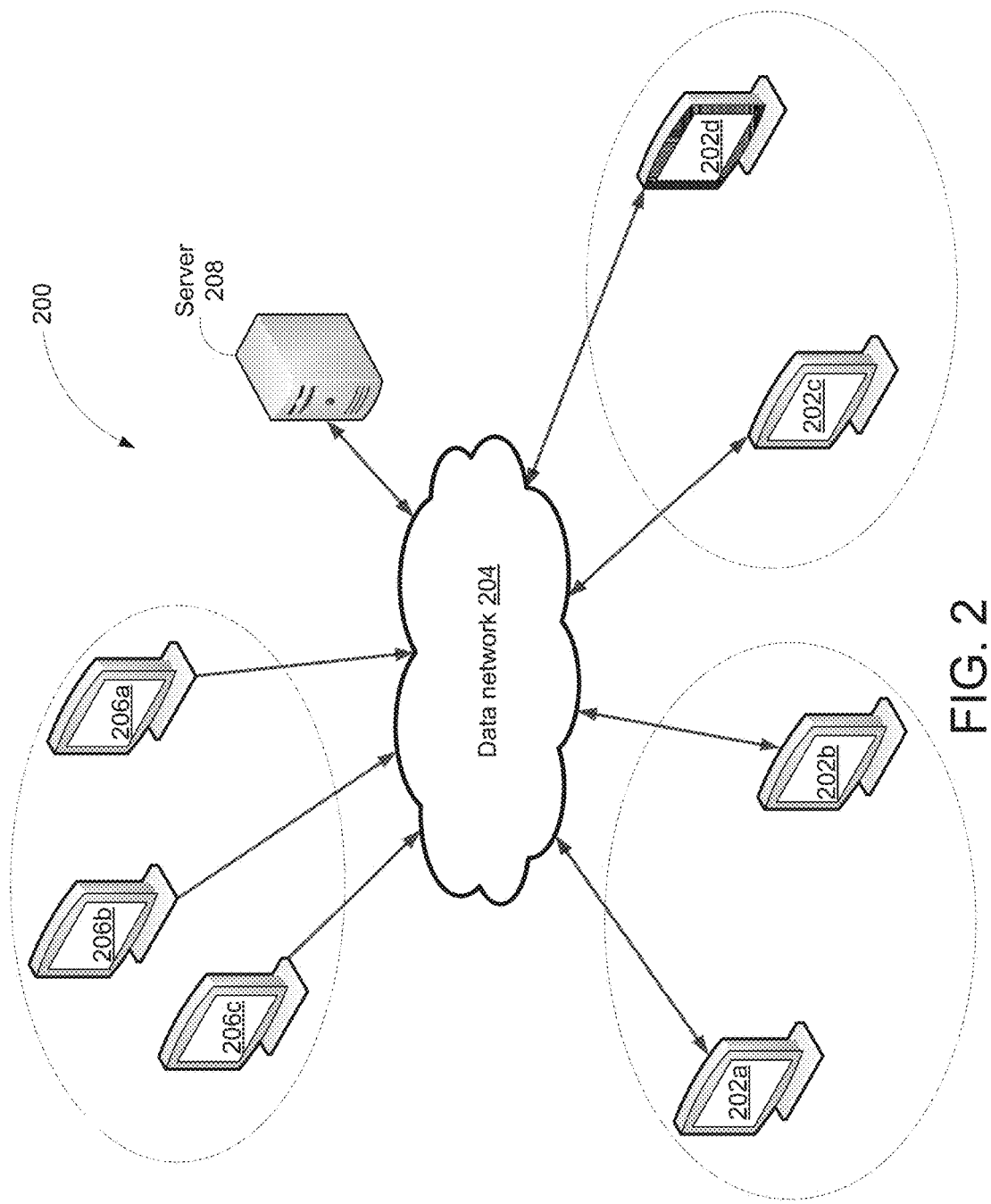
FIG. 2 illustrates an example environment in which various embodiments may be implemented.

FIG. 2 illustrates an example environment in which various embodiments may be implemented. In particular, FIG. 2 illustrates an example system 200 that may include one or more displays 202a-202d. Each of displays 202a-202d may be the same or be a different brand(s), model(s), or type(s) of display (e.g., LCD, PDP, OLED, etc.). Each of displays 202a-202 may operate in a consumer environment (e.g., home), professional environment (e.g., animation studio), or other applicable environment. It should be noted that system 200 may include more or less displays than those illustrated therein.

Each of displays 202a-202d may connect to a data network 204. In various embodiments, data network 204 may be an ad hoc network, an intranet, an extranet, a virtual private network (VPN), a local area network (LAN), a wide area network (WAN), a portion of the Internet, a portion of the Public Switched Telephone Network (PSTN), a cellular telephone network, or any combination thereof. Alternatively, data network 204 may be a wireless network system, such as a wireless personal area network (WPAN), a wireless LAN (WLAN), or other similar network. Each of displays 202a-202d may connect to data network 204 by way of one or more network connections that may include wired connections (e.g., Digital Subscriber Line (DSL), optical) and/or wireless connections (e.g., Wi-Fi.) A network connection need not necessarily be the same throughout system 200. Data network 204, although illustrated as a single network, may include multiple networks of the same type or of different types.

In some embodiments, one or more of displays 202a-202d may belong to one or more of the aforementioned networks or may be part of a separate and local network. For example, displays 202a and 202b may be co-located in a consumer's home and belong to a WLAN, while displays 202c and 202d are located in a professional animation studio and are connected to an Ethernet LAN.

Server 208 may connect to displays 202a-202d via communication medium 204 also by way of one or more network connections that may include wired connections (e.g., Digital Subscriber Line (DSL), optical) and/or wireless connections (e.g., Wi-Fi.) Again, a network connection need not necessarily be the same throughout system 200.

As described above, calibration event data can be gathered from a plurality of displays in order to predict shifts in display characteristics, e.g., luminance and color. Accordingly, system 200 may further include a plurality of other displays 206a-206c from which calibration event data can be collected. Server 208 may connect to displays 206a-206c via data network 204 by way of one or more of the aforementioned, or other network connection(s).

Although a single server 208 is illustrated in FIG. 2, it should be understood that additional servers may be utilized in accordance with other embodiments. Moreover, server 208 may host one or more databases (not shown) co-located with or implemented in server 208 or alternatively, in a distributed environment. Server 208 and/or the one or more databases may store calibration event data, as well as statistical data and/or display characteristics shift profiles (as discussed in greater detail below). It should be noted that server 208 and/or the one or more databases may also be provided in/via a non-centralized data pool, such as a peer-to-peer service, an ad-hoc network, a mesh network, etc.

Such calibration event data may be utilized to generate or otherwise derive statistical data related to display characteristics shift associated with displays 206a-206c. The statistical data may then be utilized to create a display characteristics shift profile related to luminance, color, etc. As described above, display characteristics shift can be the result of display components aging, such as an aging backlighting element, which in turn may cause a shift in luminance of a display. Thus, the statistics data can be formed into and stored as a display characteristics shift profile, which in some embodiments may be considered an "aging" profile, at server 208. The display characteristics shift profile may then be used by one or more of displays 202a-202d to self-adjust.

It should be noted that multiple display characteristics shift profiles can be created in accordance with various embodiments. In one embodiment, server 208 may be maintained at a manufacturing entity, plant, or location, and displays 206a-206c may include various models manufactured at that manufacturing entity, plant, or location. Hence, a display characteristics shift profile can be created, e.g., for each particular model or model range of displays, where an appropriate display characteristics shift model can be disseminated to one or more of displays 202a-202d that are of the same/similar model. In another embodiment, server 208 may be maintained at an animation studio that utilizes displays 202a-202d for media creation, where displays 202a-202d may be made by different manufacturers. Displays 206a-206c may be "control" displays also maintained at the animation studio from each of those different manufacturers. Display characteristics shift profiles created based on calibration data from displays 206a-206c can be used by display(s) 202a-202d made by a corresponding manufacturer.

Furthermore, it can be appreciated that the predicted display characteristics shift based on calibration data collected from displays 206a-206c may be, in certain instances, more accurate and applicable to displays 202a-202d, the more similar displays 206a-206c are to displays 202a-202d. For example, certain displays belonging to, e.g., a particular model range, may rely on the use of separate RGB LEDs for backlighting, where red, green, and blue LEDs can be independently controlled to produce varying color temperatures of white. The predicted display characteristics shift based on calibration data collected from such displays may therefore be better suited to displays that also utilize RGB LEDs for backlighting as opposed to displays that merely utilize a white LED backlight. Moreover, an estimated aging profile created based upon a particular brand of backlighting element would likely be a more accurate estimate for displays that rely on that same particular brand of backlighting element.

However, such similarities or dissimilarities may or may not be considered depending on, e.g., the context in which self-adjustment may be performed. For example, the color accuracy required of consumer displays may not be as strict as that required of professional displays used in animation studios. Hence, more "generic" display characteristics shift profiles may be created based on calibration event data gathered from one or more displays and used by consumer displays that need not be the same model, the same brand, etc. In other words, it may be adequate to perform self-adjustment of an LCD display, for example, based on the predicted display characteristics shift profile derived from calibration event data gathered from other LCD displays without regard to brand, model, or other specifics.

Display 202a may send a request to server 208 to transmit a display characteristics shift profile to display 202a. Upon receipt of the display characteristics shift profile, display 202a can calculate an appropriate adjustment curve(s)/factor(s) to compensate for any predicted performance shift(s) in display characteristics indicated in the display characteristics shift profile. For example, the display characteristics shift profile may correlate with how the backlighting element of display 202a has aged (based on the calibration event data gathered from one or more of displays 206a-206c). Based on the display characteristics shift profile, display 202a can compensate for the predicted shift in luminance.

It should be noted that display 202a need not undergo an actual calibration event in order to make such a compensation. Instead, display 202a can rely on the predicted shift in display characteristics based on the calibration data gathered from displays 206a-206c. This shift in display characteristics may be considered a "prediction" as the shift in display characteristics is not based on actual measurements made at display 202a. Rather, the predicted shift in display characteristics is based on information from displays 206a-206c. Thus, display 202a can self-adjust based on a predicted display characteristics shift rather than measuring its own, actual performance shift and calibrating its operating parameters based on that measured performance shift.

It should be further noted that in accordance with other embodiments, display 202a can alternatively or in addition to the aforementioned display characteristics shift of displays 206a-206c, rely on calibration event gleaned from its own calibration event(s). In accordance with this embodiment, display 202a can estimate its display characteristics shift based on its own calibration event data.

Further to the above, the frequency with which self-adjustment is performed may also vary, as well as the manner in which calibration data is collected. In one embodiment, as described above, displays 206a-206c may be some subset of displays that includes displays 202a-202d. In such a scenario, displays 202a-202d may be configured to periodically (and automatically) receive an updated display characteristics shift profile, and perform self-adjustment, while also uploading their own (actual) calibration event data. This exchange of information can be performed in order to continually improve the accuracy of the display characteristics shift prediction for a particular display. In another embodiment, displays 202a-202d may be configured as "pull-only" displays that are configured to request a display characteristics shift profile at the discretion of a user, and need not upload any actual calibration event data to server 208. Accordingly, the scope of statistical data gleaned from actual calibration event data can vary anywhere from a more localized set of displays to that which can encompass displays located in a particular region, such as a country, to any/all displays of a certain brand and/or model located across the world.

In order to self-adjust, a display, as described above, utilizes one or more adjustment factors or curves to compensate for its estimated and/or predicted shift in display characteristics based on one or more display characteristics shift profiles. Accordingly, in parallel with the collection of calibration event data, various embodiments can also gather relevant display usage statistics or metrics needed to track display usage, including but not limited to the following:

wall clock time elapsed between calibration events (wall clock time being distinguished from a display's internal clock); backlight "ON" time since a pervious calibration event; number of pixels refreshed; rest time (e.g., panel idle time and backlight idle time; average backlight output level; color channel mix/usage over time (which can be content driven); and other relevant or potentially relevant usage data including, but also not limited to: temperature (e.g., internal/ambient temperature); ambient lighting sampling/measurements; display fan speeds; power supply draw over time; altitude/location of a display; and display firmware version.

Additionally, actual "pre-calibration event data" (i.e., display characteristics observed just prior to a calibration event) may be stored. Such pre-calibration event data can be used to compute deltas for luminance, colorimetry, or other changing metrics including, e.g., spatial uniformity if that data is measured & collected. Such pre-calibration event data can be used to further enhance the accuracy of any adjustment factor(s)/curve(s) used for self-adjustment of a display. Referring back to FIG. 2, the display usage statistics, pre-calibration event data, as well as the delta information may be stored at server 208 and/or the one or more databases associated with server 208.

Calculations for deriving the adjustment factor(s)/curve(s) can be based on a combination of the gathered calibration event data, the relevant display usage statistics or metrics collected over time, as well as the delta information. For example, color offsets, decay, and/or other compensatory changes can be computed by using "correlation approximation," pattern matching, and/or similar algorithms or formulae.

A display can better approximate the adjustment factor(s)/curve(s) for continuous self-adjustment as more relevant display usage statistics or metrics and delta information are collected over time. This is similar to how the accuracy of display characteristics shift estimates can increase as more calibration event data is collected over time. That is, over time, a display can continue to minimize the deviation from an actual calibration event. For example, as a display ages and gets more use, and multiple calibrations events are completed at some interval, the display can mine its own historical performance and relevant display usage statistics or metrics with ever-improving accuracy to determine how much offset should be set in the display to best match an actual likely calibration.

It should be noted that the one or more algorithms or formulae that can be utilized by a display to compute one or more adjustment factors or curves may also be updated as better or more accurate correlative data is found, or as advancements in display technology occur. For example, a display can manually or automatically update its own list of algorithms/formulae from a central location (such as from a manufacturer database/server, for example), locally, or even switch between versions of formulae when a comparison is desired.

In accordance with another embodiment, display usage statistics and metrics collected from other displays can also be used (similar to the use of calibration event data). Such additional display usage statistics and metrics can augment or replace a display's own display usage statistics and metrics (maintained as internally stored data) that the display leverages for calculating adjustment factors or curves. Hence, referring back to FIG. 2, displays 206(a)-206(c) may also individually contribute, e.g., their own display usage statistics, calibration offset and decay data, relative correlation accuracy, as well as other relevant data. The knowledge base of display usage statistics and metrics can then be expanded to encompass a plurality of the same (or similar) displays deployed and working in the same animation studio, company network, or which provide publicly available data in the same city, state, country, hemisphere, or even the entire world.

The approximation accuracy for a self-adjustment factor or curve would improve as the knowledge base grows. Hence, a large increase in self-adjustment efficiency can be obtained by performing actual calibration on a relatively small subset of displays to obtain relevant heuristics, while allowing a larger subset of displays to leverage those heuristics for their own self-adjustment over time. Such a technique can be thought of, from one perspective, as "crowd sourcing" self-adjustment information.

Figure 3:
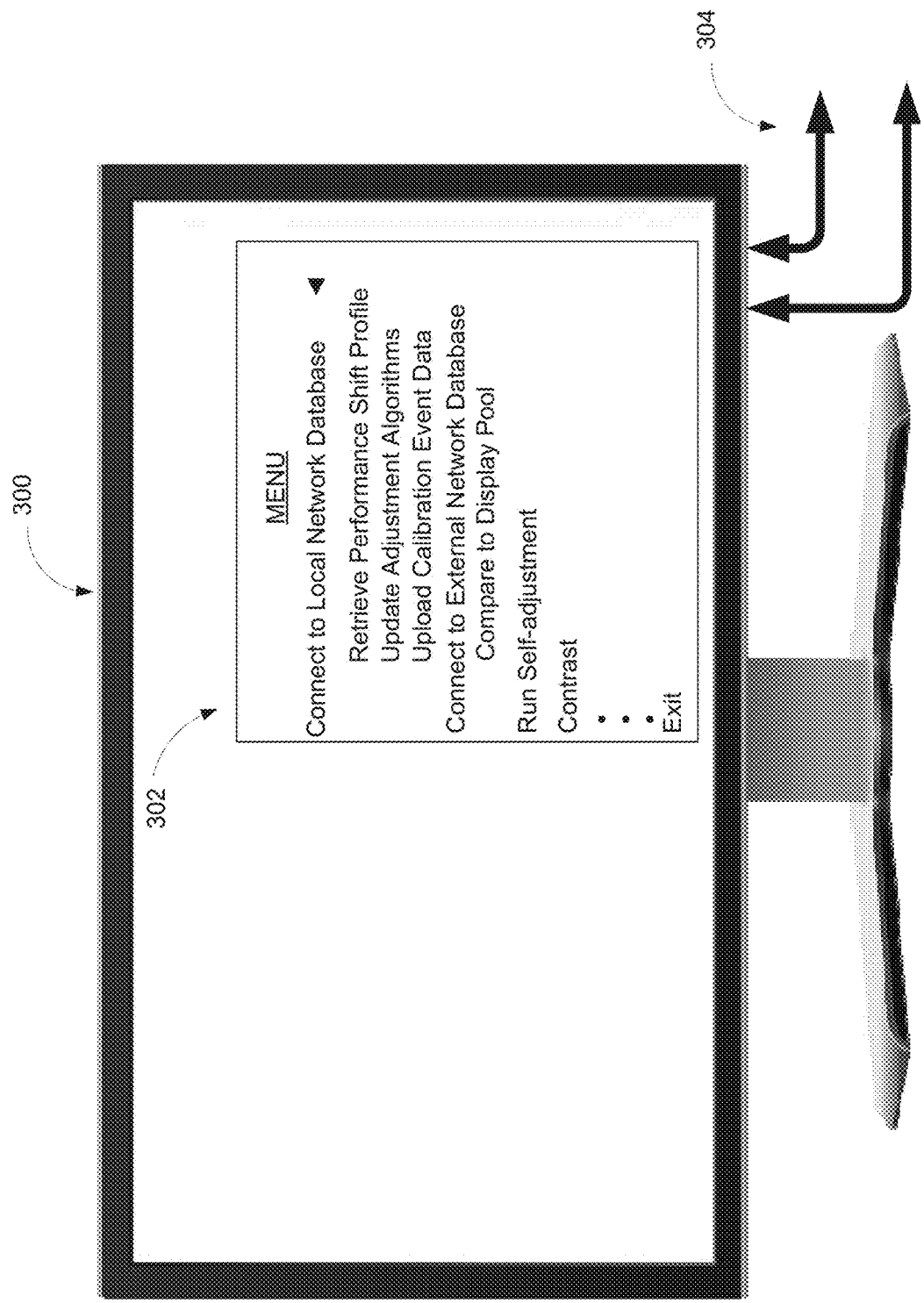
FIG. 3 illustrates an example self-adjusting display in accordance with various embodiments.

FIG. 3 illustrates a self-adjusting display 300 in accordance with various embodiments. Self-adjusting display 300 may be an LCD, PDP, LED, OLED, or other type of electronic visual display. A user of self-adjusting display 300 may access a menu 302 that allows the user to select one or more functions for controlling, calibrating, and performing self-adjustment on self-adjusting display 300. For example, by actuating a menu button (not shown) on self-adjusting display 300, menu 302 can be presented to the user. The user may then opt to perform one or more actions presented as options in menu 302.

As described above, self-adjusting display 300 can connect to one or more databases/servers and request a display characteristics shift profile, an update to its internal adjustment algorithms utilized in calculating an adjustment factor (s)/curve(s) to compensate for estimated shift in display characteristics, etc. Accordingly, self-adjusting display 300 may have one or more network connections 304 that it may utilize in order to access such databases/servers (e.g., server 208 of FIG. 2). As also described above, network connections 304 can be any one or more of various types of network connections, whether wired or wireless. Network connections 304 may also allow self-adjusting display 300 to connect to other displays, such as displays in other rooms of a house in a consumer setting, or other displays in a LAN, such as in a professional setting. Moreover, self-adjusting display 300 may provide an option to compare its performance with other displays, e.g., to determine whether it is statistically performing outside of the parameters of peer displays. Standard deviation techniques can be utilized to compare one or more calibration event parameters, and the results can be displayed to the user.

As described previously, calibration event data can be gathered from one or more remotely located displays, e.g., displays 206a-206c of FIG. 2 and/or from a self-adjusting display itself, e.g., self-adjusting display 300 of FIG. 3. In particular, a calibration event may entail determining or obtaining an operating status of a display. For example, the number of hours a display has been in use/on, any color preset(s) that have been applied, and the internal temperature of a display can be received or determined. The calibration event may also be identified. To identify a particular calibration event, the model/make of the display, the serial number of the display, as well as the date and/or time of day when the calibration event occurs can be obtained or determined. A pre-calibration check can be performed, where color drift data (e.g., x,y chromaticity, luminance for RGB primaries, and white point values) can be measured and recorded. To run the actual calibration, a color preset(s) can be transmitted or applied to the display and the calibration can be performed. After the performance of a calibration event, post-calibration verification can be performed. That is, color errors can be measured and recorded, and it can be determined whether the display characteristics resulting from the calibration event meet or fail to meet (pass/fail) the desired display characteristics.

Accordingly, data from the above-described calibration event, as well as performance of the pre-calibration check and post-calibration verification can be obtained, recorded, and used to generate a display characteristics shift profile. Such data can be recorded in a tabular (or other format) for analysis and use, an example of which is provided in Table 1.

TABLE 1

| | |
|---|---|
| EVENT IDENTIFIER DATA | Display model; Display serial model; date/time of day |
| MONITOR STATUS DATA | Display hours; Color preset(s); Display internal temperature |
| PRE-CALIBRATION CHECK DATA | Color drift - chromaticity; luminance; white point |
| POST-CALIBRATION VERIFICATION DATA | Color error(s); Calibration P/F |

Figure 4:
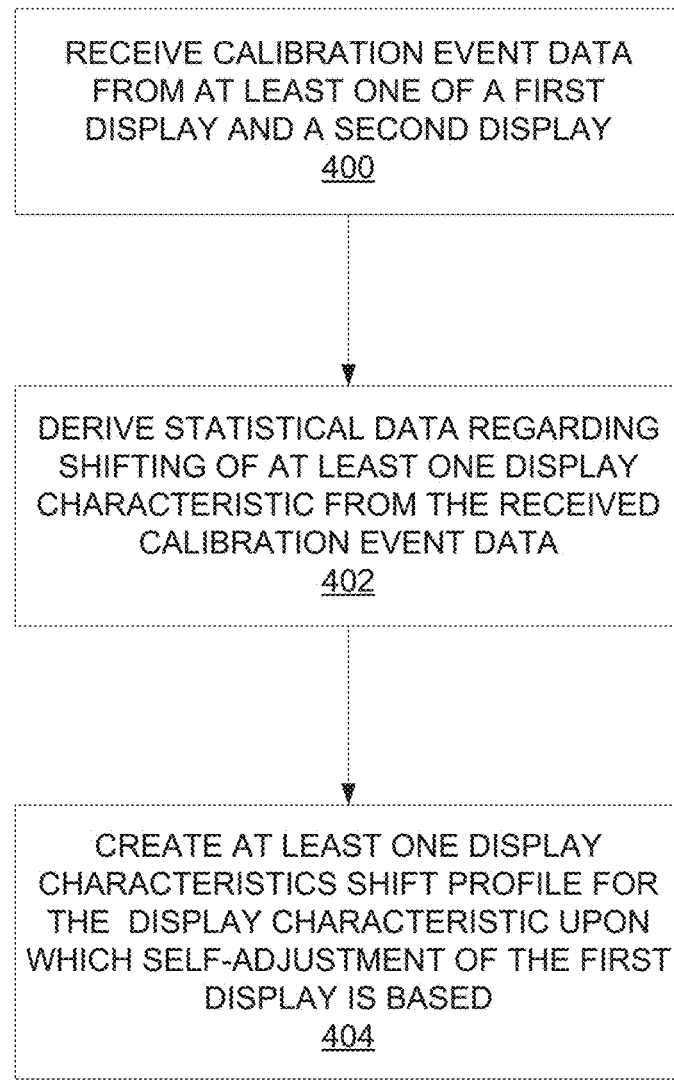
FIG. 4 is an operational flow diagram illustrating an example process enabling self-adjustment in a display in accordance with various embodiments.

FIG. 4 is an operational flow diagram illustrating an example process enabling self-adjustment in a display in accordance with various embodiments. From a server/data repository or system perspective, for example, calibration event data is received from at least one of a first display and a second display at operation 400. As described previously, calibration event data may be received at a server and/or data repository from one or more displays, i.e., the second display connected to the server and/or data repository via one or more networks and/or network connections. Alternatively, or in addition to the aforementioned calibration event data, calibration event data may be collected from the display, i.e., the first display, itself. Statistical data is derived regarding shifting of at least one display characteristic from the received calibration event data at operation 402. For example, with regard to luminance, statistical techniques (e.g., descriptive statistics) can be applied to the collected calibration event data to discern that in, e.g., a plurality of displays, luminance has dropped-off by some amount and/or in accordance with some curve over time. Accordingly, at least one display characteristics shift profile is created for the display characteristic upon which self-adjustment of the first display is based at operation 404. With regard to luminance, at least one display characteristics shift profile may be a backlighting element aging profile, for example. As described above, a display can self-adjust to compensate for its estimated display characteristics shift based on the display characteristics shift profile received from the server or itself to avoid undergoing actual calibration events or at least lessening the frequency of calibration events it undergoes.

Figure 5:
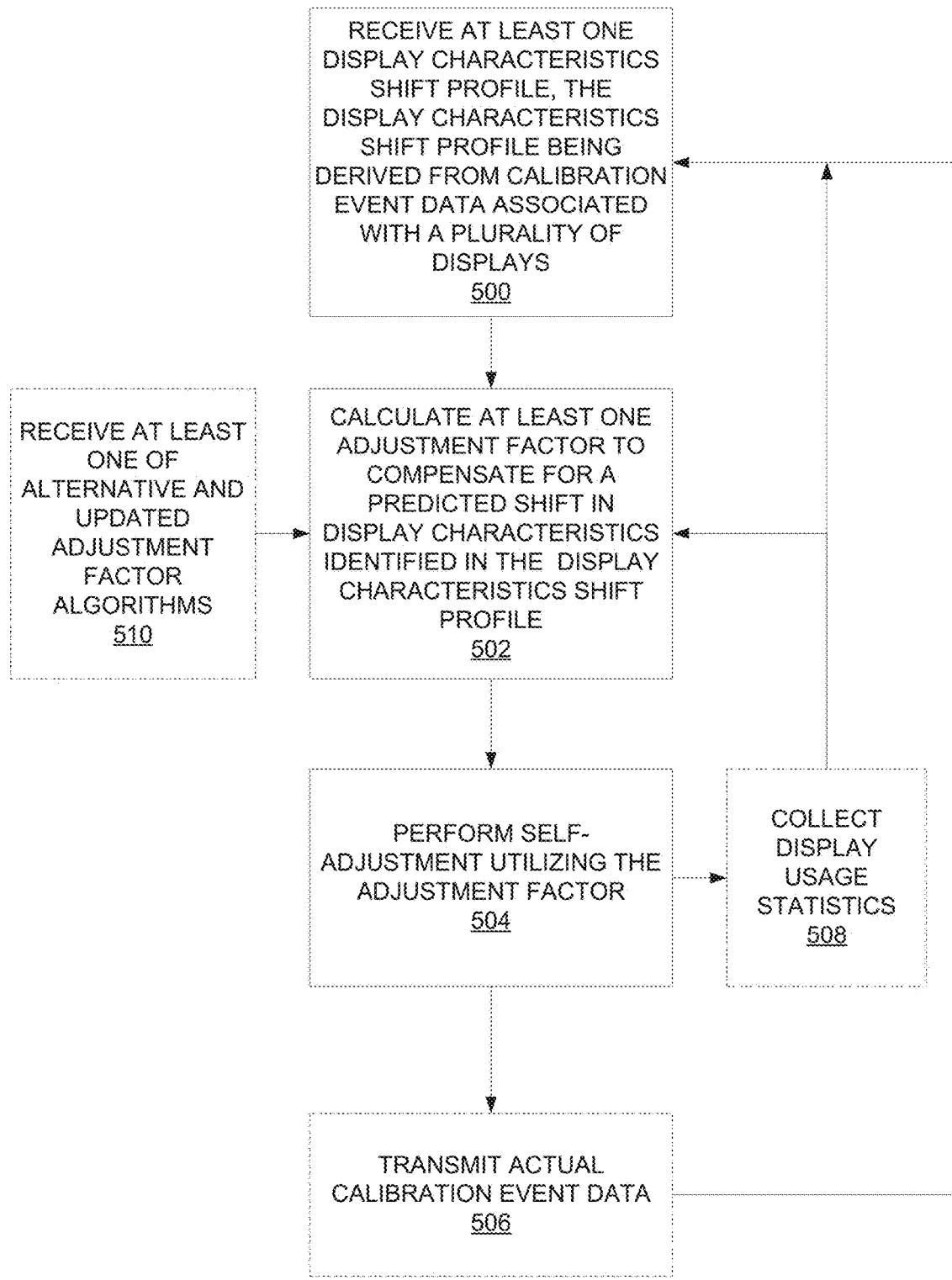
FIG. 5 is an operational flow diagram illustrating an example process for self-adjustment of a display in accordance with various embodiments.

FIG. 5 is an operational flow diagram illustrating an example process for self-adjustment of a display in accordance with various embodiments. From a display perspective, at least one display characteristics shift profile is received, the display characteristics shift profile being derived from calibration event data associated with a plurality of displays at operation 500. As previously described, some subset of displays may be utilized for gathering actual calibration event data, from which statistical data is derived regarding a display characteristics shift of an operating/display characteristic such as color rendition. The statistical data can be utilized to generate a display characteristics shift profile that can be used as an estimate of shift in display characteristics of the display. Accordingly, at least one adjustment factor is calculated to compensate for a predicted display characteristics shift identified in the display characteristics shift profile at operation 502. One or more algorithms or formulae may be utilized to calculate adjustment factors, while at the same time considering display usage statistics and metrics. The display may then perform self-adjustment utilizing the adjustment factor at operation 504.

In order to allow the display to become increasingly accurate in its self-adjustment, it too can transmit its own actual calibration event data to a server for collection and consideration when deriving statistical data. Thus, actual calibration event data can optionally be transmitted at operation 506. Another optional operation may entail the display collecting its own (historical) display usage statistics at operation 508. Such display usage statistics can be utilized by the display itself as part of calculating the requisite adjustment factor(s) or they can be sent to a server to grow the knowledge base of display information that can ultimately be utilized to better estimate display characteristics shifts, for example. Still another operation may entail receiving at least one of an alternative and updated adjustment factor algorithm at operation 510. As display technology progresses and/or as the knowledge base of display information grows, a display may update or replace the one or more algorithms used in calculating adjustment factors with alternative or updated adjustment algorithms.

Various embodiments have been described in the context of self-adjustment regarding luminance and color performance/spectral colorimetry. However, it is contemplated that various embodiments can gather data and/or self-adjust with respect to any characteristic or parameter relevant to display performance or operation, such as spatial uniformity, sharpness, contrast ratio, etc.

Still other performance considerations may involve what can be referred to as "Next Generation Content." In particular, desired performance characteristics of a display, such as a consumer-oriented display, may be geared to optimally display a certain type(s) of multimedia content presented to a user. Applicable characteristics or attributes that can be taken into account may include, but are not limited to: screen brightness, the extension of color gamut (i.e., the amount of colors that can be displayed); bit depth (e.g., hues that go beyond what today's sets routinely display); frame rates; and other image characteristics (that might vary at certain points in time).

Accordingly, some embodiments may access one or more servers (e.g., server 208 of FIG. 2) that can link or otherwise relate a particular content provider's content to one or more attributes/sets of attributes for displaying that content in an optimal or desired manner. That is, the one or more servers may send a signal or other information to a display instructing the display to adjust its operating parameters or attributes to optimize the user experience and display for that particular content automatically in accordance with a preferred set of attributes. This can be done in a similar manner as that described above for sending a display characteristics shift profile. Alternatively, a preferred set of attributes can be retrieved or sent to the display, where a user can choose to replace or augment (e.g., temporarily) its current operating parameters.

Current generation content may also benefit from the various embodiments described herein by giving a display an awareness of characteristics associated with certain content to be displayed, as well as a display's operating attributes. For example, content can be broadcast with, or have embedded therein, a "flag" that can indicate to a display that it should self-adjust or that it can be adjusted in order to optimize the display or presentation of that content. In one embodiment, the flag may be a pointer to attributes or a set(s) of attributes associated with the content that the display can request, download, or otherwise be provided with.

By gathering and leveraging historical data (e.g., display usage statistics and metrics and calibration event/event-related data), various embodiments provide the ability to rely significantly less on actual calibration events, while still ensuring the display is operating in an optimal or preferred manner. Hence, a display is much more likely to remain accurate between calibrations. In scenarios or environments where a large number of displays are deployed, it is possible to calibrate only a small number of displays, yet have all the displays leverage the patterns learned by gathering calibration event data to estimate where/how they are likely to drift. Thus, all of the displays can remain near (or eventually, at) a calibrated performance level without actually undergoing a calibration event or by undergoing significantly fewer calibration events.

Figure 6:
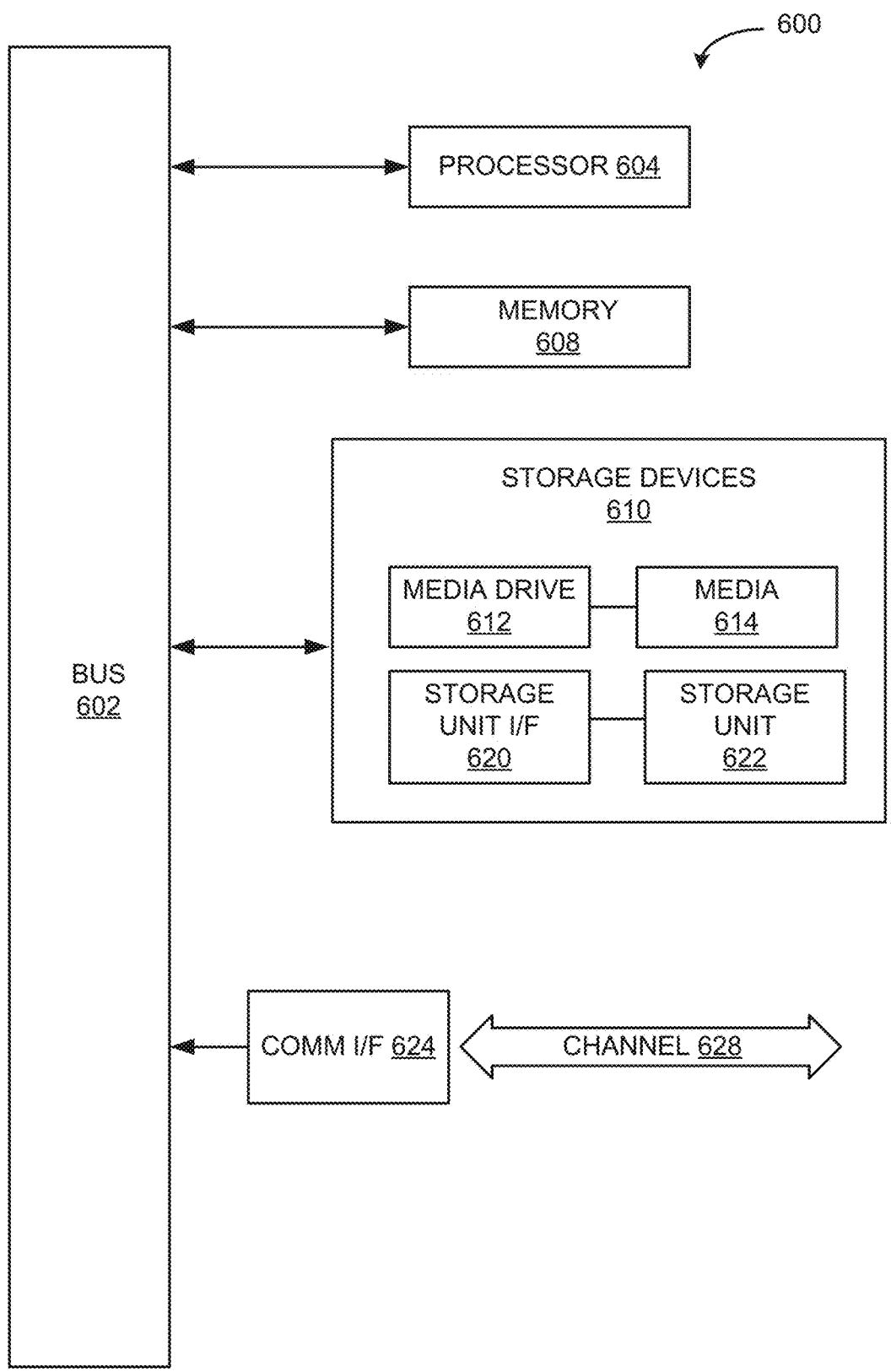
FIG. 6 is an example computing module that may be used to implement various features of embodiments described in the present disclosure.

FIG. 6 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example navigation systems, portable computing devices, and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD or DVD drive (R or RW), or other removable or fixed media drive might be provided. Accordingly, storage media 614 might include, for example, a hard disk, an integrated circuit assembly, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
receiving calibration event data from at least one of a first display and a second display, the calibration event data comprising one or more measurements previously recorded during a calibration event of the first display, second display, or combination thereof;
deriving statistical data regarding shifting of at least one display characteristic from the received calibration event data;
creating at least one display characteristics shift profile based upon the derived statistical data;
calculating at least one adjustment factor to compensate for a predicted shift in the at least one display characteristics over time identified in the at least one display characteristics shift profile; and
performing self-adjustment, without performing calibration, utilizing the adjustment factor.

2. The computer-implemented method of claim 1, wherein the first display is the same or similar to the second display with respect to at least one of display type, display brand, and display model.

3. The computer-implemented method of claim 1, wherein the display characteristic comprises one of display luminance, display colorimetry, and spatial uniformity.

4. The computer-implemented method of claim 1, further comprising forwarding the display characteristics shift profile from the second display in response to a request from the first display.

5. The computer-implemented method of claim 1, further comprising receiving display usage statistics from at least one of the first display and the second display.

6. The computer-implemented method of claim 5, further comprising transmitting the display usage statistics from the second display to the first display.

7. The computer-implemented method of claim 1, further comprising transmitting an instruction to the first display to adjust at least one operating attribute, the operating attribute being associated with presenting particular content in an optimal manner.

8. The computer-implemented method of claim 7, wherein the operating attribute comprises one of screen brightness of the first display, color gamut extension of the first display, bit depth of the first display, and frame rate of the first display.

9. A non-transitory computer readable medium having computer executable program code embodied thereon, the computer executable program code configured to cause a non-calibrated display to:
receive at least one display characteristics shift profile, the display characteristics shift profile being derived from calibration event data associated with a plurality of displays, the calibration event data comprising one or more measurements previously recorded during a calibration event of one or more of the plurality of devices;

calculate at least one adjustment factor to compensate for a predicted shift in display characteristics over time identified in the display characteristics shift profile; and perform self-adjustment, without performing calibration, utilizing the adjustment factor.

10. The non-transitory computer readable medium of claim 9, wherein the computer executable program code is configured to further cause the non-calibrated display to transmit calibration event data to a server from which the display characteristics shift profile is received upon calibration of the non-calibrated display, the transmitted calibration event data adding to the calibration event data associated with the plurality of displays.

11. The non-transitory computer readable medium of claim 9, wherein the computer executable program code configured to cause the non-calibrated display to calculate the adjustment factor further causes the non-calibrated display to utilize at least one adjustment algorithm, the adjustment algorithm being at least one of a correlation approximation algorithm and a pattern matching algorithm.

12. The non-transitory computer readable medium of claim 9, wherein the computer executable program code is configured to further cause the non-calibrated display to update and replace the adjustment algorithm with an updated algorithm and/or an alternative algorithm, respectively.

13. The non-transitory computer readable medium of claim 9, wherein the computer executable program code is configured to further cause the non-calibrated display to collect display usage statistics.

14. The non-transitory computer readable medium of claim 13, wherein the display usage statistics comprise at least one of an elapsed wall clock time between calibration events, a time a backlight element has been operative since a previous calibration event, a number of pixels refreshed, a rest time, an average backlight output level, color channel usage over time, at least one of internal and ambient temperature, ambient lighting, fan speed, power supply draw over time, altitude, location, and firmware version.

15. The non-transitory computer readable medium of claim 9, wherein the computer executable program code is configured to further cause the non-calibrated display to collect pre-calibration event data prior to the non-calibrated display undergoing a calibration event.

16. A system, comprising:

a first set of displays;

a data repository connected to each of the first set of displays and configured to receive calibration event data collected from each of the first set of displays, the calibration event data comprising one or more measurements previously recorded during a calibration event performed on each of the first set of displays; and a second set of displays communicatively connected to the data repository, each of the second set of displays being configured to:

receive a display characteristics shift profile associated with a display characteristic of each of the second set of displays, the display characteristics shift profile being derived from the calibration event data collected from each of the first set of displays;

calculate at least one adjustment factor to compensate for a predicted shift in the display characteristic over time of each of the second set of displays, the predicted shift in the display characteristic over time being identified in the display characteristics shift profile; and perform self-adjustment, without performing calibration, utilizing the adjustment factor while in a non-calibrated state.

17. The system of claim 16, wherein each of the second set of displays are further configured to utilize at least one adjustment algorithm to calculate the adjustment factor, the adjustment algorithm comprising at least one of a correlation approximation algorithm and a pattern matching algorithm.

18. The system of claim 16, wherein the data repository is further configured to receive at least one of display usage statistics from each of the first set of displays and display usage statistics from each of the second set of displays.

19. The system of claim 16, wherein each of the second set of displays is further configured to refine the adjustment factor based on at least one of display usage statistics from each of the first set of displays and display usage statistics from each of the second set of displays.

20. The system of claim 16, wherein the first and second sets of displays are part of at least one network comprising a consumer-based network of displays, a corporate-based network of displays, a regional-based network of displays, and a global network of displays.

* * * * *